(12) United States Patent
Su et al.

(10) Patent No.: US 7,733,958 B2
(45) Date of Patent: Jun. 8, 2010

(54) METHOD FOR FAST MULTIPLE REFERENCE FRAME MOTION ESTIMATION

(75) Inventors: Yeping Su, Seattle, WA (US);
Ming-Ting Sun, Mercer Island, WA (US); Shin-Huang Chang, Tainan (TW)

(73) Assignee: Sunplus Technology Co., Ltd., Hsinchu (TW)

(*) Notice: Subject to any disclaimer, the term of this patent is extended or adjusted under 35 U.S.C. 154(b) by 1415 days.

(21) Appl. No.: 11/135,326

(22) Filed: May 24, 2005

(65) Prior Publication Data

US 2006/0120613 A1    Jun. 8, 2006

(30) Foreign Application Priority Data

Dec. 7, 2004    (TW) ............... 93137862 A (51) Int. Cl.
| | |
|---|---|
| H04N 7/12 | (2006.01) |
| H04N 11/02 | (2006.01) |
| H04N 11/04 | (2006.01) |
| H04B 1/66 | (2006.01) |

(52) U.S. Cl. .............................. 375/240.16
(58) Field of Classification Search ............... None
See application file for complete search history.

(56) References Cited

U.S. PATENT DOCUMENTS 5,793,429 A * 8/1998 Kim et al. ............ 375/240.17
6,130,912 A * 10/2000 Chang et al. ........... 375/240.16
6,782,052 B2    8/2004 Sun et al.
2006/0018381 A1 * 1/2006 Luo et al. ............... 375/240.16

OTHER PUBLICATIONS

Chang et al, A Novel Approach To Fast Multi-Frame Selection For H.264 Video Coding, Mar. 2003, IEEE, pp. III-413-III-416.*
Yeping Su et. al.; *Fast Multiple Reference FRAME Motion Estimation for h.264*; Jun. 2004; IEEE International Conference On Multimedia and Expo; 6 pp.

* cited by examiner

*Primary Examiner*—Nhon T Diep
(74) *Attorney, Agent, or Firm*—Bacon & Thomas, PLLC (57) ABSTRACT

A method for fast multiple reference frame motion estimation, which is used to perform motion estimation between a current frame and reference frames $F_{n-1}, F_{n-2}, \ldots, F_{n-k}$. The method performs a special block matching to find a plurality of motion vectors for blocks of each frame with respective to a previous frame and then composes motion vector(s) of the current frame referring to the reference frame $F_{n-(k-1)}$ and a motion vector of the reference frame $F_{n-(k-1)}$ referring to the reference frame $F_{n-k}$ into composed motion vectors of the current frame referring to the reference frame $F_{n-k}$ for the block in the current frame. The method selects a composed motion vector with a minimum of cost function from the composed motion vectors produced when composing the motion vectors and then finely adjusts the composed motion vector selected, thereby obtaining an adjusted motion vector.

14 Claims, 7 Drawing Sheets

METHOD FOR FAST MULTIPLE REFERENCE FRAME MOTION ESTIMATION

BACKGROUND OF THE INVENTION

1. Field of the Invention

The invention relates to the technical field of motion estimation and, more particularly, to a method for fast multiple reference frame motion estimation (fast MRF-ME).

2. Description of Related Art

Current video coding standards essentially use motion estimation (ME) to remove the redundancies from an image sequence, thereby obtaining higher image compression performance. In the H.264/MPEG-4 AVC video coding standard, multiple reference frame motion compensation and variable blocksize motion compensation are used to achieve such a high image compression performance.

When multiple reference frame motion estimation (MRF-ME) is used, a picture can be predicted from multiple reference frames. Because each reference frame is used for motion estimation, the computation for MRF-ME is increased rapidly.

Figure 1:
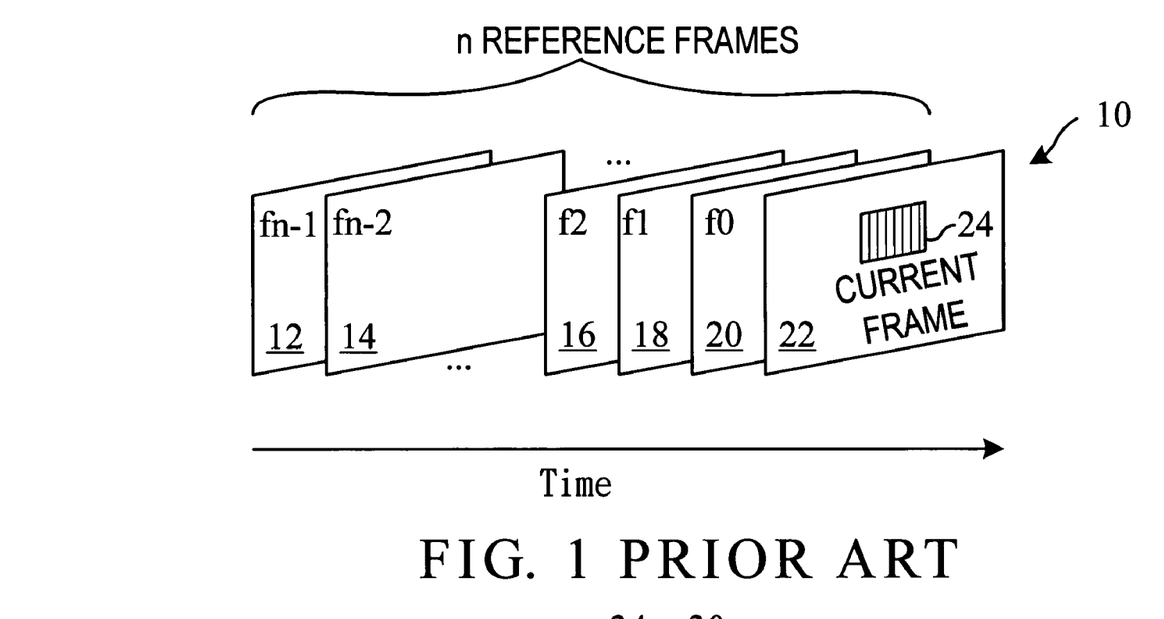
FIG. 1 is a schematic diagram of multiple reference frames typically used as searching a motion vector.
Figure 2:
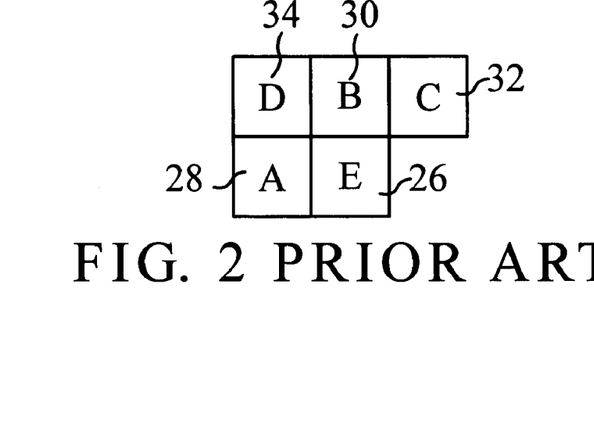
FIG. 2 is a diagram of an image block and its adjacent image blocks in a current frame.

U.S. Pat. No. 6,782,052 granted to Shijun, et al. for a "Reference frame prediction and block mode prediction for fast motion searching in advanced video coding" discloses a method of reference frame prediction to determine reference frames. As shown in FIG. 1, reference frames 12, 14 ... 22 are sequentially arranged along a time axis, wherein the frame 22 is current frame. In FIG. 2, block 26 indicates a target for motion estimation in a current frame, and blocks 28, 30, 32 and 34 are adjacent to the block 26 in the current frame. A predictive reference frame fp has p reference frames away from the current frame, wherein p is determined by an equation $p=\min(n-1, p_0+\max(a,b,c,d))$. That is, even the number of searched frames is reduced from n to p, the computation is still huge for the MRF-ME to be performed on each of the reference frames from zero to p.

Therefore, it is desirable to provide an improved MRF-ME to mitigate and/or obviate the aforementioned problems.

SUMMARY OF THE INVENTION

The object of the invention is to provide a method for fast multiple reference frame motion estimation, which can avoid the huge computation to increase the coding efficiency.

In accordance with one aspect of the present invention, there is provided a method for fast multiple reference frame motion estimation. The method is used to code an image frame sequence including a current frame Fn and multiple previous reference frames Fn−1, Fn−2, . . . , Fn−(k−1) and Fn−k positioned rearward in time with respective to the current frame Fn, where n and k are an integer, the frames being divided into a plurality of blocks, the method finding motion vectors for a block in the current frame referring to the multiple reference frames. The method includes a block-matching step, a motion vector composing step, a selecting step and a fine adjusting step. The block-matching step performs a special block matching to find a plurality of motion vectors for blocks of each frame referring to a previous one frame. The motion vector composing step obtains composed motion vectors of the current frame referring to the reference frame Fn−k for the block, wherein $$MVn(i)=MVn(i-1)+MVn-(i-1)(1)$$

where MVn(i) are the composed motion vectors of the current frame referring to the reference frame Fn−i, MVn(i−1) is the motion vector of the current frame referring to the reference frame Fn−(i−1) and MVn−(i−1)(1) are the motion vectors of the reference frame Fn−(i−1) referring to the reference frame Fn−i, $2 \leq i \leq k$. The selective step selects one with a minimum of cost function from the composed motion vectors MVn(i) produced in the motion vector composing step. The fine adjusting step finely adjusts the composed motion vector selected, thereby obtaining a final motion vector of the current frame referring to the reference frame Fn−i.

In accordance with another aspect of the present invention, there is provided a method for fast multiple reference frame motion estimation. The method is used to code an image frame sequence including a current frame Fn and multiple previous reference frames Fn−1, Fn−2, . . . , Fn−(k−1) and Fn−k positioned rearward in time with respective to the current frame Fn, where n and k are an integer, the frames being divided into a plurality of blocks, the method finding motion vectors for a block in the current frame referring to the multiple reference frames. The method includes a block-matching step, a motion vector composing step and a global selecting step. The block-matching step performs a special block matching to find a plurality of motion vectors for blocks of each frame with respective to a previous one frame. The motion vector composing step combines the motion vectors that are obtaining in the block-matching step for a block of the current frame referring to the reference frame Fn−1, Fn−2, . . . , Fn−(k−1) and Fn−k. The global selecting step selects one with a minimum of cost function from the motion vectors produced in the motion vector composing step.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
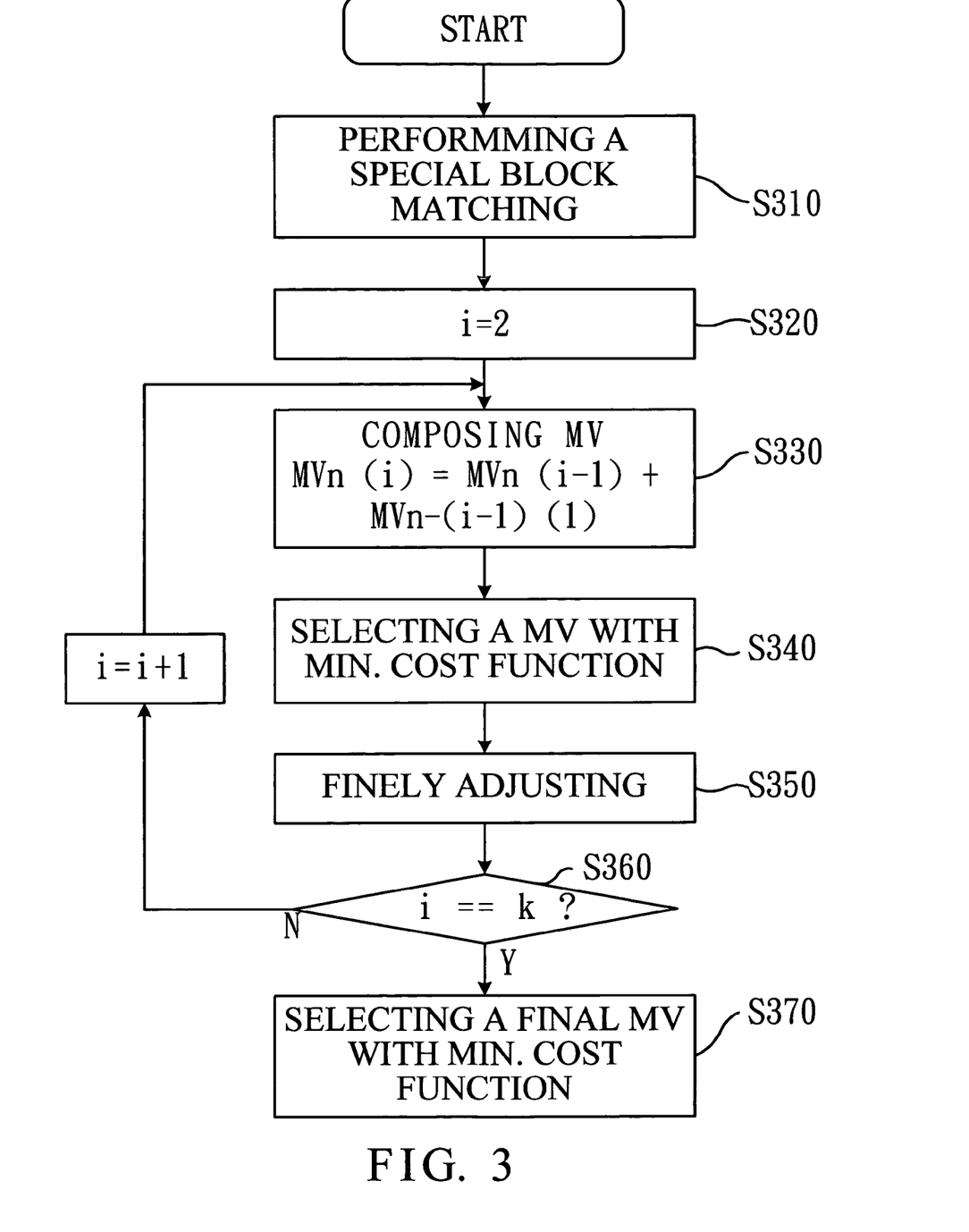
FIG. 3 is a flowchart of a method for fast multiple reference frame motion estimation (fast MRF-ME) in accordance with the invention.
Figure 4:
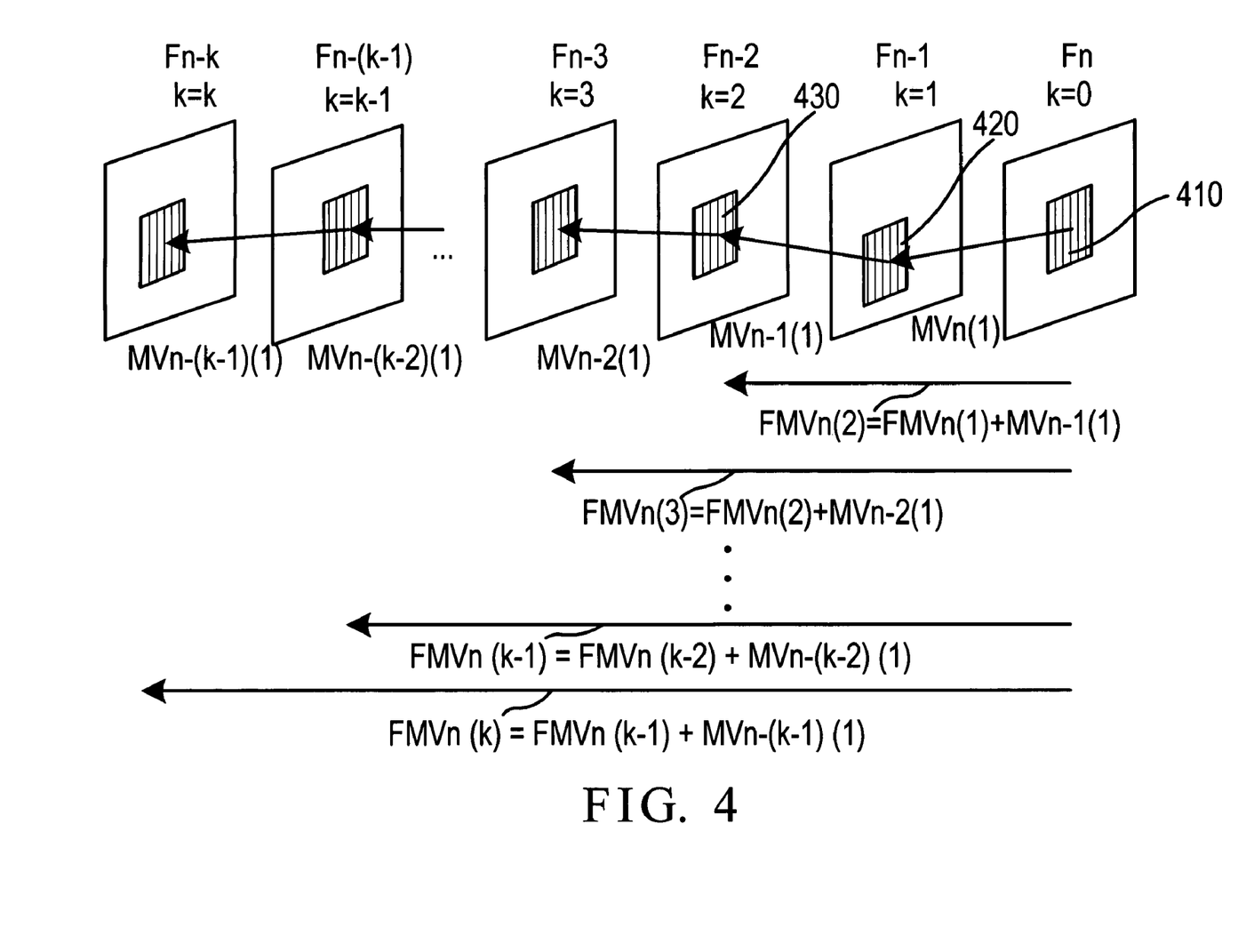
FIG. 4 is a schematic diagram of an image frame sequence in accordance with the invention.

FIG. 3 is a flowchart of a method for fast multiple reference frame motion estimation (fast MRF-ME) in accordance with the invention. The method is used in an image frame sequence coding as shown in FIG. 4. Referring to FIG. 3 and FIG. 4, the image frame sequence includes a current frame Fn and multiple reference frames. The multiple reference frames are positioned rearward in time with respective to the current frame Fn, denoted as Fn−1, Fn−2, . . . , Fn−(k−1) and Fn−k. The frames are divided into a plurality of blocks. The method can find best motion vectors of the current frame referring to the multiple reference frames Fn−1, Fn−2, . . . , Fn−(k−1) and Fn−k for a block 410 in the current frame.

In step S310, it performs a special block matching to find a plurality of motion vectors for blocks of each frame referring to a previous one frame, That is, it performs a special block matching between the current frame Fn and the previous reference frame Fn−1, the reference frame Fn−1 and the previous reference frame Fn−2, etc. When it performed the multiple reference frame motion estimation of the reference frame Fn−1, motion vectors of the reference frame Fn−1 referring to the reference frame Fn−2, Fn−3, . . . , Fn−k were obtained previously. In step S310, it only performs a special block matching between the current frame Fn and a previous reference frame Fn−1 on the block 410 to thus obtain a motion vector MVn(1). Block 420 is the best match block in the reference frame Fn−1 for the block 410. The special block matching can be a full-search block matching, diamond searching, three-step searching, four-step searching, hexagon searching or 2D logarithmic searching.

In step S320, i=2 is set to represent that a motion vector Mvn(2) is obtained by referring the block 410 in the current frame Fn to the reference frame Fn−2.

In step S330, it combines a motion vector MVn(i−1) of the current frame Fn referring to the reference frame Fn−(i−1) and motion vectors MVn−(i−1)(1) of the reference frame Fn−(i−1) referring to the reference frame Fn−i into composed motion vectors MVn(i) of the current frame Fn referring to the reference frame Fn−i for the block 410. When i=2, it represents that the motion vector Mvn(2) of the current frame Fn referring to the reference frame Fn−2 for the block 410 is obtained by adding the motion vector MVn(1) of the current frame Fn referring to the reference frame Fn−1 and the motion vectors Mvn−1(1) of the reference frame Fn−1 referring to the reference frame Fn−2. The motion vectors Mvn−1(1) are obtained by performing a special block matching between the reference frame Fn−1 and its previous reference frame Fn−2 on the block 420. Block 430 is the best match block in the reference frame Fn−2 for the block 420. Because the inventive method is applied to each frame in the image frame sequence, the motion vectors MVn−1(1) is obtained as the reference frame Fn−1 is coded.

Figure 5:
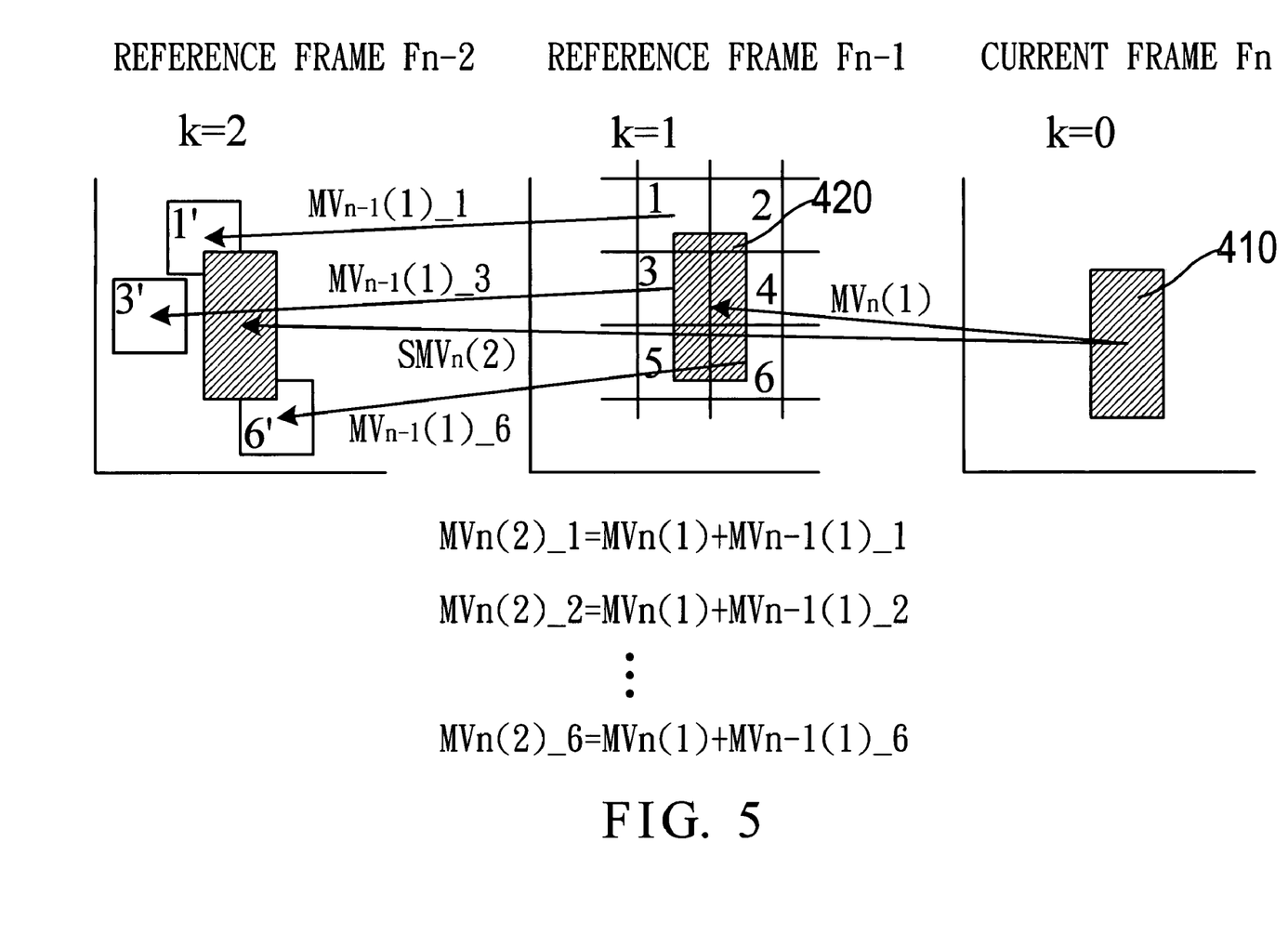
FIG. 5 is a schematic diagram of motion vector composition in accordance with the invention.

FIG. 5 is a schematic diagram of motion vector composition. As shown, the block 410 is a 4×8 size of block, the motion vector MVn(1) performs a special block matching between the current frame Fn and its previous reference frame Fn−1 on the block 410, and the block 420 is the best match block in the reference frame Fn−1 for the block 410. Because the block 420 covers parts of blocks 1-6 in the reference frame Fn−1, a 4×4 size of block is applied to the blocks 1-6 respectively. The block 1 and its previous reference frame Fn−2 have a motion vector MVn−1(1)__1. The block 2 and its previous reference frame Fn−2 have a motion vector Mvn−1(1)__2. Similarly, the block 6 and its previous reference frame Fn−2 have a motion vector MVn−1(1)__6. When combining motion vector MVn(2) in step S330, six candidate motion vectors MVn(2)__1 to MVn(2)__6 are produced, wherein MVn(2)__1=MVn(1)+MVn−1(1)__1, MVn(2)__2=MVn(1)+MVn−1(1)__2, . . . , and MVn(2)__6=Mvn(1)+MVn−1(1)__6.

In step S340, it selects a motion vector with a minimum of cost function from the motion vectors MVn(2)__1 to MVn(2)__6 produced in the motion vector composing step, as a selective motion vector SMVn(2) of the current frame Fn referring to the reference frame Fn−2 for the block 410. The cost function is represented by $J(m, \lambda_{motion})=SAD(s, c(m))+\lambda_{motion} \cdot R(m-p)$, where $m=(m_x, m_y)^T$ is a motion vector (MV), $p=(p_x, p_y)^T$ is a predictive motion vector (PMV), R(m−p) is a motion vector information, and $\lambda_{motion}=(0.85 \cdot 2^{QP/3})^{1/2}$ is a corrective factor.

In step S350, it finely adjusts the selective motion vector SMVn(2), thereby obtaining a final motion vector. The fine adjustment performs ±J pixel adjustment on the selective motion vector SMVn(2) and selects an adjusted motion vector with a minimum of cost function as the final motion vector, where J is an integer ranged from one to five. In this embodiment, J=1. Namely, the final motion vector MVn(2) of the current frame Fn referring to the reference frame Fn−2 for the block 410 is now obtained. Referring again to FIG. 4, the motion vectors FMVn(2), FMVn(3), . . . , FMVn(k) all refer as the final motion vector. It is clear to see that a computation required for the fast multiple reference frame motion estimation (fast MRF-ME) is carried out only by performing a special block matching between the current frame Fn and its previous reference frame Fn−1 on the block 410, i.e., by means of motion vector composition, thereby obtaining motion vectors of current frame Fn referring to reference frames Fn−1, Fn−2, . . . , Fn−(k−1) and Fn−k for a block 410 in the current frame Fn.

Step S360 determines if all final motion vectors of the current frame Fn referring to the reference frame Fn−1, Fn−2, . . . , Fn−(k−1) and Fn−k are complete for the block 410 in the current frame Fn. If any final motion vector is not complete, index i is added by one, and then step S330 is executed. If all motion vectors are complete, step S370 is executed.

When step S370 is to be executed, it represents that the final motion vectors FMVn(2), FMVn(3), . . . , FMVn(k) of the current frame Fn referring to the reference frames Fn−1, Fn−2, . . . , Fn−(k−1) and Fn−k are obtained for the block 410. Accordingly, step S370 selects one with a minimum of cost function from the final motion vectors FMVn(2), FMVn(3), . . . , FMVn(k) of the current frame referring to the reference frames Fn−1, Fn−2, . . . , Fn−(k−1) and Fn−k, as a best motion vector of the block 410 in the current frame Fn. For different reference frames, the cost function has to consider R'(ref), where R'(ref) is reference frame information. In this case, the cost function is represented by $J(m, ref, \lambda_{motion})=SAD(s, c(m, ref))+\lambda_{motion} \cdot (R(m-p)+R'(ref))$, where $m=(m_x, m_y)^T$ is a motion vector (MV), $P=(p_x, p_y)^T$ is a predictive motion vector (PMV), R(m−p) is a motion vector information, $\lambda_{motion}=(0.85 \cdot 2^{QP/3})^{1/2}$ is a corrective factor, ref is a reference frame and R'(ref) is information of the reference frame.

In this embodiment, the block 410 in the current frame Fn has the sizes of 16×16, 16×8, 8×16, 8×8, 8×4, 4×8 and 4×4 pixels.

Figure 6:
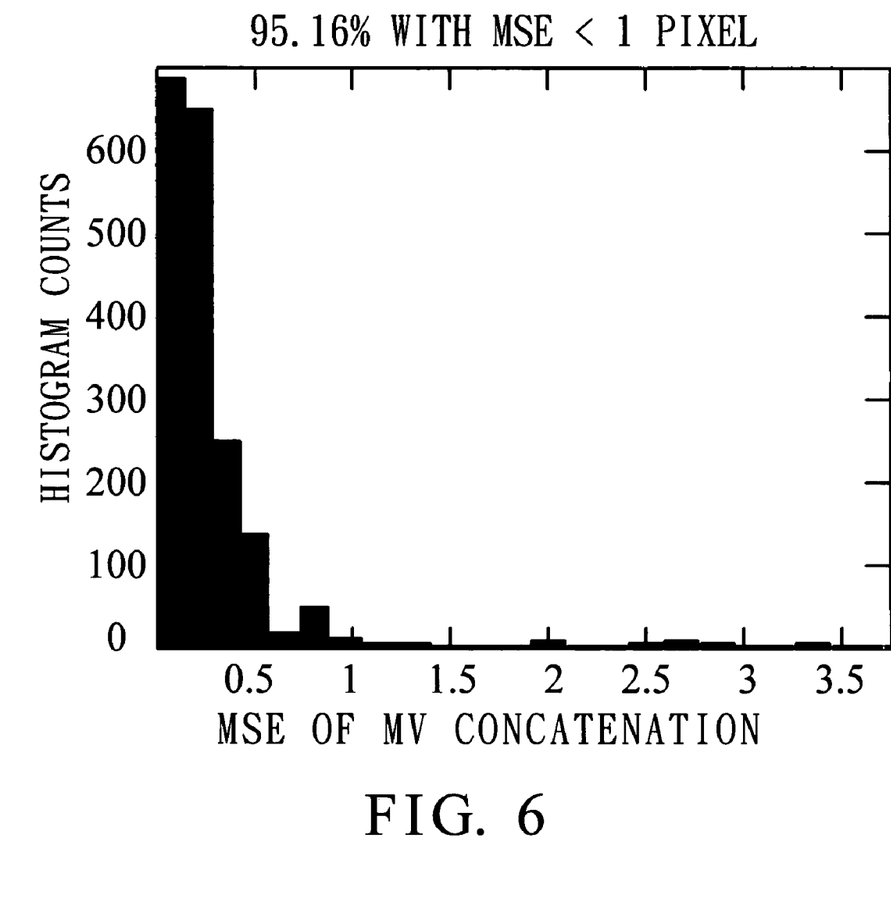
FIG. 6 is a mean square error histogram between the inventive motion estimation and the prior full-search motion estimation.
Figure 7A:
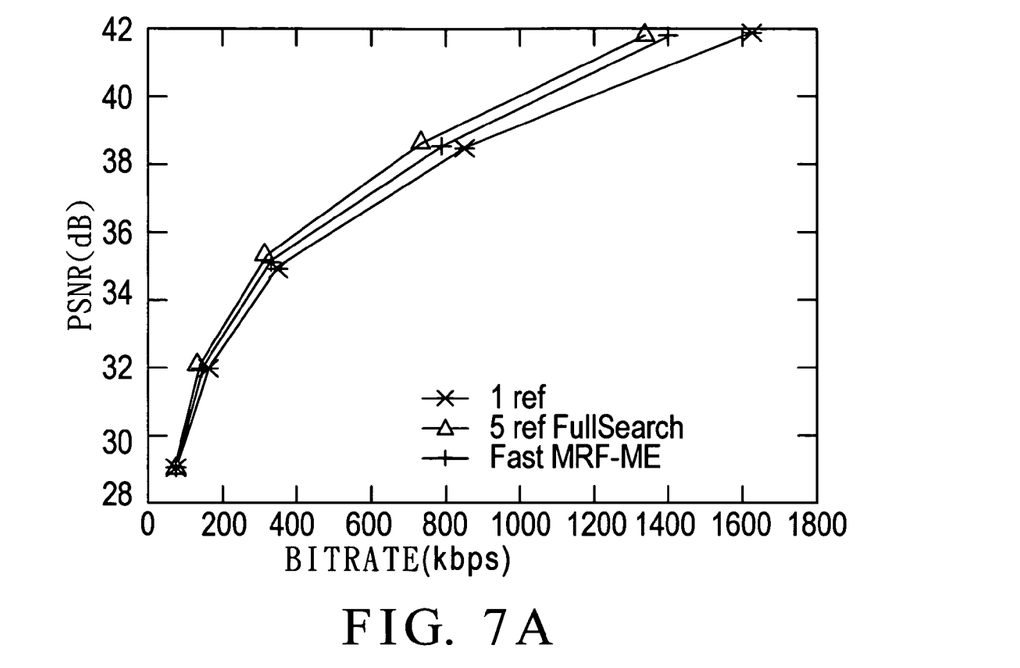
FIGS. 7(A) to 7(D) show graphs of simulation results of comparing the inventive fast MRF-ME and the prior full-search block matching at different resolution standards.
Figure 7B:
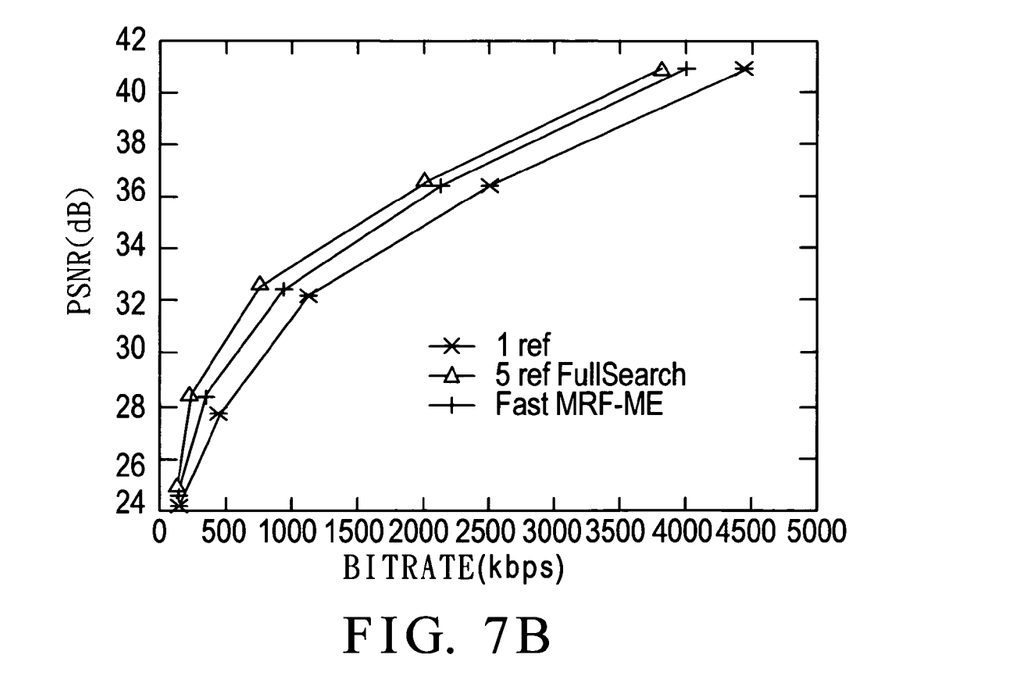
Figure 7C:
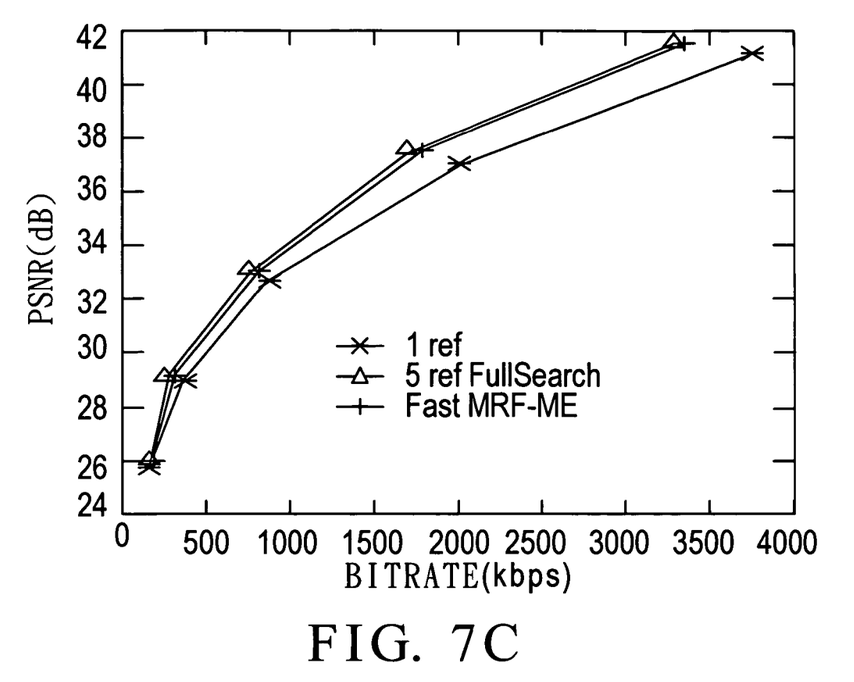
Figure 7D:
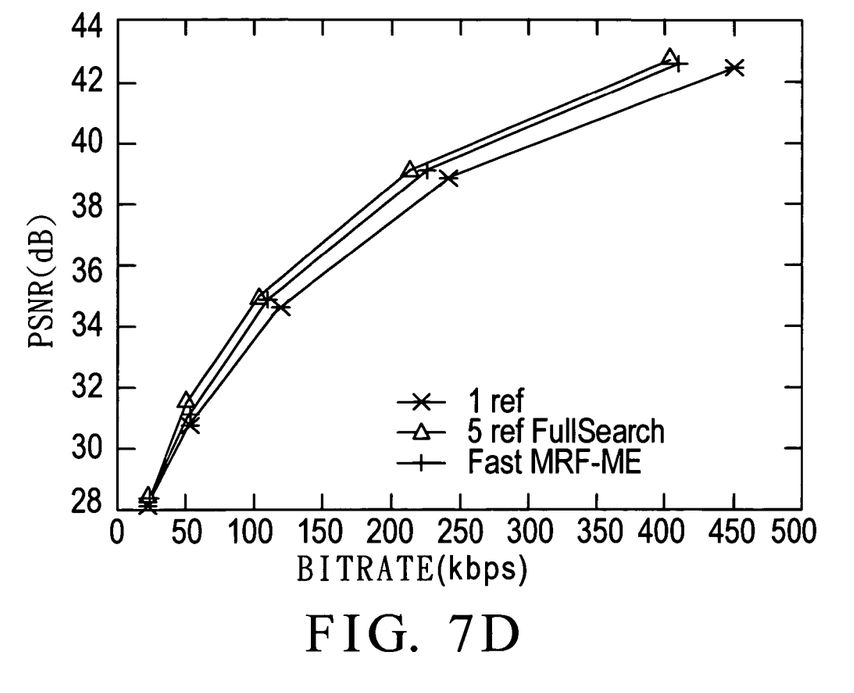

The fast MRF-ME can utilize the correlation between the multiple reference frames. The correlation can be represented by addition of motion vectors, i.e., MVn(i)=MVn(i−1)+MVn−(i−1)(1), whether MVn(i) represents motion vector(s) of the current frame Fn referring to the reference frame Fn−i for a block in the current frame Fn, MVn(i−1) represents motion vector(s) of the current frame Fn referring to the reference frame Fn−(i−1) for the block in the current frame Fn, MVn−(i−1)(1) represents motion vector(s) of the reference frame Fn−(i−1) referring to the reference frame Fn−i. FIG. 6 is a mean square error histogram between the inventive motion estimation and the conventional full-search motion estimation, which illustrates a comparison of the conventional motion vector CMVn(2) and the composed motion vector MVn(1)+MVn−1(1). The conventional motion vector CMVn(2) contains motion vectors of the current frame Fn referring to the reference frame Fn−2 for a block in the current frame Fn, which is obtained by full-search block matching. As shown in FIG. 6, appropriate 95.16 percent of the composed motion vector MVn(1)+MVn−1(1) and conventional motion vector CMVn(2) have the mean square error less than one pixel. Accordingly, the fast MRF-ME is practical and able to reduce the computational complexity produced by the full-search block matching.

The fast MRF-ME requires only performing a special block matching between the current frame Fn and its previous reference frame Fn−1 on the block 410 in computation. This is because before the motion vectors are composed, the previous motion vectors are obtained. In table 1, the average computational number of the inventive fast MRF-ME is compared with that of the full-search block matching that the inventive fast MRF-ME has a significant speedup. Computation reduction proportion can be computed by an equation $T_{FullSearch}/T_{FastMRF-ME}$, where T denotes the total runtime of the motion estimation. The experiments are conducted on a PC with 2 GHz P4 CPU, with respective search range listed in Table 1.

TABLE 1

| Sequence | Resolution | Search Range | Computation Reduction |
|---|---|---|---|
| Mobile | CIF, 300 frame | ±32 | 2.85 |
| Tempete | CIF, 260 frame | ±32 | 2.77 |
| Foreman | CIF, 300 frame | ±32 | 2.83 |
| Carphone | QCIF, 382 frame | ±32 | 3.07 |

FIGS. 7(A) to 7(D) show rate distortion curves, which are simulation results of comparing the inventive fast MRF-ME and the conventional full-search block matching at different resolution standards. In the figures, the fast MRF-ME has the peak signal-to-noise ratio (PSNR) almost the same as the full-search block matching using five reference frames, and better than using one reference frame.

As aforementioned, the fast MRF-ME requires only performing a special block matching between the current frame Fn and its previous reference frame Fn−1 on the block 410 and composing the motion vectors in computation. Thus, for the block 410 in the current frame Fn, the motion vectors of the current frame Fn referring to the reference frames Fn−1, Fn−2, ..., Fn−(k−1) and Fn−k are obtained. Accordingly, the computational complexity in the conventional art is overcome to thus increase the coding performance.

Although the present invention has been explained in relation to its preferred embodiment, it is to be understood that many other possible modifications and variations can be made without departing from the spirit and scope of the invention as hereinafter claimed.

What is claimed is:

1. A method for fast multiple reference frame motion estimation, which is used to code an image frame sequence including a current frame Fn and multiple previous reference frames Fn−1, Fn−2, ..., Fn−(k−1) and Fn−k positioned rearward in time with respective to the current frame Fn, where n and k are an integer, the frames being divided into a plurality of blocks, the method finding motion vectors for a block in the current frame referring to the multiple reference frames, the method comprising:

a block-matching step, which performs a special block matching to find a plurality of motion vectors for blocks of each frame referring to a previous one frame;

a motion vector composing step, which obtains composed motion vectors of the current frame referring to the reference frame Fn−k for the block, wherein $$MVn(i)=MVn(i-1)+MVn-(i-1)(1)$$

where MVn(i) is the composed motion vectors of the current frame referring to the reference frame Fn−i, MVn(i−1) is the motion vector of the current frame referring to the reference frame Fn−(i−1) and MVn−(i−1)(1) is the motion vectors of the reference frame Fn−(i−1) referring to the reference frame Fn−i, i is an integer and $2 \leq i \leq k$;

a selecting step, which selects one with a minimum of cost function from the composed motion vectors MVn(i) produced in the motion vector composing step; and a fine adjusting step, which finely adjusts the composed motion vector selected, thereby obtaining a final motion vector of the current frame referring to the reference frame Fn−i, wherein in the selecting step, the cost function is represented by $J(m, \lambda_{motion})=SAD(s, c(m))+\lambda_{motion} \cdot R(m-p)$, where $m=(m_x, m_y)^T$ is a motion vector, $p=(p_x, p_y)^T$ is a predictive motion vector, $R(m-p)$ is a motion vector information, and $\lambda_{motion}=(0.85 \cdot 2^{QP/3})^{1/2}$ is a corrective factor.

2. The method as claimed in claim 1, wherein the motion vector composing step, the selecting step and the fine adjusting step are repeated until a final motion vector of the current frame referring to the reference frame Fn−k are composed.

3. The method as claimed in claim 1, further comprising:

a global selecting step, which selects a final motion vector with a minimum of cost function from final motion vectors produced when the block in the current frame refers respectively to the reference frames Fn−1, Fn−2, ..., Fn−(k−1) and Fn−k as a best motion vector of the block in the current frame.

4. The method as claimed in claim 1, wherein the special block matching is a full-search block matching, diamond searching, three-step searching, four-step searching, hexagon searching or 2D logarithmic searching.

5. The method as claimed in claim 1, wherein the fine adjusting step adjusts the composed motion vector with the minimum of cost function by ±J pixels.

6. The method as claimed in claim 5, wherein J is an integer ranged from one to five.

7. The method as claimed in claim 3, wherein in the global selecting step, the cost function is represented by $J(m, ref, \lambda_{motion})=SAD(s, c(m, ref))+\lambda_{motion} \cdot (R(m-p)+R'(ref))$, where $m=(m_x, m_y)^T$ is a motion vector, $p(p_x, p_y)^T$ is a predictive motion vector, $R(m-p)$ is a motion vector information, $\lambda_{motion}=(0.85 \cdot 2^{QP/3})^{1/2}$ is a corrective factor, ref is a reference frame and R' (ref) is information of the reference frame.

8. The method as claimed in claim 1, wherein the block in the current frame has a size selected from 16×16, 16×8, 8×16, 8×8, 8×4, 4o8 and 4×4 pixels.

9. A method for fast multiple reference frame motion estimation, which is used to code an image frame sequence including a current frame Fn and multiple previous reference frames Fn−1, Fn−2, ..., Fn−(k−1) and Fn−k positioned rearward in time with respective to the current frame Fn, where n and k are an integer, the frames being divided into a plurality of blocks, the method finding motion vectors for a block in the current frame referring to the multiple reference frames, the method comprising:

a block-matching step, which performs a special block matching to find a plurality of motion vectors for blocks of each frame referring to a previous one frame;

a motion vector composing step, which obtains composed motion vectors of the current frame referring to the reference frame Fn−k for the block, wherein $$MVn(i)=MVn(i-1)+MVn-(i-1)(1)$$

where MVn(i) is the composed motion vectors of the current frame referring to the reference frame Fn−i, MVn(i−1) is the motion vector of the current frame referring to the reference frame Fn−(i−1) and MVn−(i−1)(1) is the motion vectors of the reference frame Fn−(i−1) referring to the reference frame Fn−i, i is an integer and $2 \leq i \leq k$;

a selecting step, which selects one with a minimum of cost function from the composed motion vectors MVn(i) produced in the motion vector composing step;

a fine adjusting step, which finely adjusts the composed motion vector selected, thereby obtaining a final motion vector of the current frame referring to the reference frame Fn−I; and a global selecting step, which selects a final motion vector with a minimum of cost function from final motion vectors produced when the block in the current frame refers respectively to the reference frames Fn−1, Fn−2, ..., Fn−(k−1) and Fn−k as a best motion vector of the block in the current frame, wherein in the global selecting step, the cost function is represented by $J(m, ref, \lambda_{motion})=SAD(s, c(m, ref))+\lambda_{motion} \cdot (R(m-p)+R'(ref))$, where $m=(m_x, m_y)^T$ is a motion vector, $p=(p_x, p_y)^T$ is a predictive motion vector, $R(m-p)$ is a motion vector information, $\lambda_{motion}=(0.85 \cdot 2^{QP/3})^{1/2}$ is a corrective factor, ref is a reference frame and R'(ref) is information of the reference frame.

10. The method as claimed in claim 9, wherein the motion vector composing step, the selecting step and the fine adjusting step are repeated until a final motion vector of the current frame referring to the reference frame Fn−k are composed.

11. The method as claimed in claim 9, wherein the special block matching is a full-search block matching, diamond searching, three-step searching, four-step searching, hexagon searching or 2D logarithmic searching.

12. The method as claimed in claim 9, wherein the fine adjusting step adjusts the composed motion vector with the minimum of cost function by ±J pixels.

13. The method as claimed in claim 12, wherein J is an integer ranged from one to five.

14. The method as claimed in claim 9, wherein the block in the current frame has a size selected from 16×16, 16×8, 8×16, 8×8, 8×4, 4×8 and 4×4 pixels.

* * * * *